US011917004B2

United States Patent
Sivakumar et al.

(10) Patent No.: US 11,917,004 B2
(45) Date of Patent: *Feb. 27, 2024

(54) PRIORITIZING DATA REPLICATION PACKETS IN CLOUD ENVIRONMENT

(71) Applicant: International Business Machines Corporation, Armonk, NY (US)

(72) Inventors: Gandhi Sivakumar, Melbourne (AU); Kushal S. Patel, Pune (IN); Luke Peter Macura, Melbourne (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,613

(22) Filed: Jul. 15, 2022

(65) Prior Publication Data

US 2023/0156080 A1    May 18, 2023

Related U.S. Application Data

(63) Continuation of application No. 17/529,389, filed on Nov. 18, 2021, now Pat. No. 11,425,196.

(51) Int. Cl.
*H04L 67/1095* (2022.01)
*H04L 67/1097* (2022.01)
(Continued)

(52) U.S. Cl.
CPC ...... *H04L 67/1095* (2013.01); *H04L 67/1097* (2013.01); *H04L 67/61* (2022.05); *H04L 67/133* (2022.05)

(58) Field of Classification Search
CPC ............. H04L 67/1095; H04L 67/1097; H04L 67/322; H04L 67/40
See application file for complete search history.

(56) References Cited

U.S. PATENT DOCUMENTS 7,454,457 B1 * 11/2008 Lowery ............... H04L 67/1001
709/224
8,190,561 B1 * 5/2012 Poole .................. H04L 67/1095
707/610
(Continued)

FOREIGN PATENT DOCUMENTS

| CN | 104854567 A | * | 8/2015 | .......... G06F 11/1451 |
| CN | 106453132 A |   | 2/2017 | |

(Continued)

OTHER PUBLICATIONS

List of IBM Patents or Patent Applications Treated as Related, Aug. 22, 2022.

(Continued)

*Primary Examiner* — Shean Tokuta

(57) ABSTRACT

Provided is a system and method which prioritizes data replication packets between a private cloud and a public cloud which provides a backup for the private cloud. In one example, the method may include receiving a request from a software application to write data to a storage location of a private cloud that hosts the software application, identifying storage attributes of the storage location of the private cloud, generating a replication request for replicating the data over a network to a public cloud, embedding a priority tag into the replication request based on the identified storage attributes of the storage location of the private cloud, and transmitting the tagged replication request over the network from the private cloud to the public cloud based on a bandwidth assigned to the embedded priority tag.

25 Claims, 11 Drawing Sheets

(51) Int. Cl.
  *H04L 67/61*  (2022.01)
  *H04L 67/133*  (2022.01)

(56) References Cited

U.S. PATENT DOCUMENTS

| | | | | |
|---|---|---|---|---|
| 8,407,335 | B1* | 3/2013 | Church | G06F 11/0709 |
| | | | | 709/224 |
| 8,762,642 | B2 | 6/2014 | Bates et al. | |
| 9,424,437 | B1 | 8/2016 | Ancin et al. | |
| 9,477,555 | B1 | 10/2016 | Hagan et al. | |
| 9,800,514 | B1* | 10/2017 | Chen | H04L 69/22 |
| 9,825,878 | B2 | 11/2017 | Kulkarni et al. | |
| 10,019,181 | B2 | 7/2018 | Singh et al. | |
| 10,140,036 | B2 | 11/2018 | Kelner et al. | |
| 10,324,635 | B1* | 6/2019 | Meiri | G06F 3/0661 |
| 10,503,427 | B2 | 12/2019 | Botes et al. | |
| 10,592,123 | B1* | 3/2020 | Gudipati | G06F 3/0685 |
| 10,599,340 | B1* | 3/2020 | Gudipati | G06F 13/18 |
| 10,929,424 | B1* | 2/2021 | Vaidya | H04L 67/1095 |
| 11,079,961 | B1* | 8/2021 | Meiri | G06F 3/0613 |
| 11,425,196 | B1* | 8/2022 | Sivakumar | H04L 67/61 |
| 2007/0136541 | A1* | 6/2007 | Herz | G06F 11/1466 |
| | | | | 714/E11.124 |
| 2007/0156536 | A1* | 7/2007 | Alfandary | G06Q 20/203 |
| | | | | 705/22 |
| 2012/0106507 | A1* | 5/2012 | Venkataswami | H04L 45/50 |
| | | | | 370/331 |
| 2012/0185433 | A1* | 7/2012 | Harris, Jr. | G06F 11/2066 |
| | | | | 707/623 |
| 2013/0254323 | A1* | 9/2013 | Bhalerao | H04L 67/5682 |
| | | | | 709/213 |
| 2016/0048408 | A1 | 2/2016 | Madhu et al. | |
| 2016/0274793 | A1* | 9/2016 | Oashi | G06F 3/0683 |
| 2017/0134283 | A1 | 5/2017 | Iles et al. | |
| 2017/0366460 | A1 | 12/2017 | Friedman et al. | |
| 2019/0163371 | A1* | 5/2019 | Nambiar | G06F 3/065 |
| 2020/0092752 | A1* | 3/2020 | Henry | H04W 28/10 |
| 2021/0006571 | A1* | 1/2021 | Yi | H04L 63/102 |
| 2021/0019161 | A1* | 1/2021 | Hadas | G06F 9/45558 |
| 2021/0096928 | A1* | 4/2021 | Reed | G06F 11/1448 |
| 2021/0160187 | A1* | 5/2021 | Mitra | H04W 28/02 |
| 2022/0035726 | A1* | 2/2022 | Lifshitz | G06F 9/542 |
| 2022/0103618 | A1* | 3/2022 | Pinheiro | H04L 67/60 |

FOREIGN PATENT DOCUMENTS

| | | | | |
|---|---|---|---|---|
| WO | WO-0157665 A2 * | 8/2001 | | H04L 29/06 |
| WO | 2012127476 A1 | 9/2012 | | |
| WO | WO-2012127476 A1 * | 9/2012 | | G06F 11/1461 |
| WO | WO-2021178979 A1 * | 9/2021 | | G07C 5/008 |

OTHER PUBLICATIONS

Gandhi Sivakumar et al., "Prioritizing Data Replication Packets in Cloud Environment", U.S. Appl. No. 17/529,389, filed Nov. 18, 2021 (is not provided as this application is available to the Examiner).

Method for Improved Pricing for Disaster Recovery as a Service in Hybrid Cloud Environment, May 12, 2020.

* cited by examiner

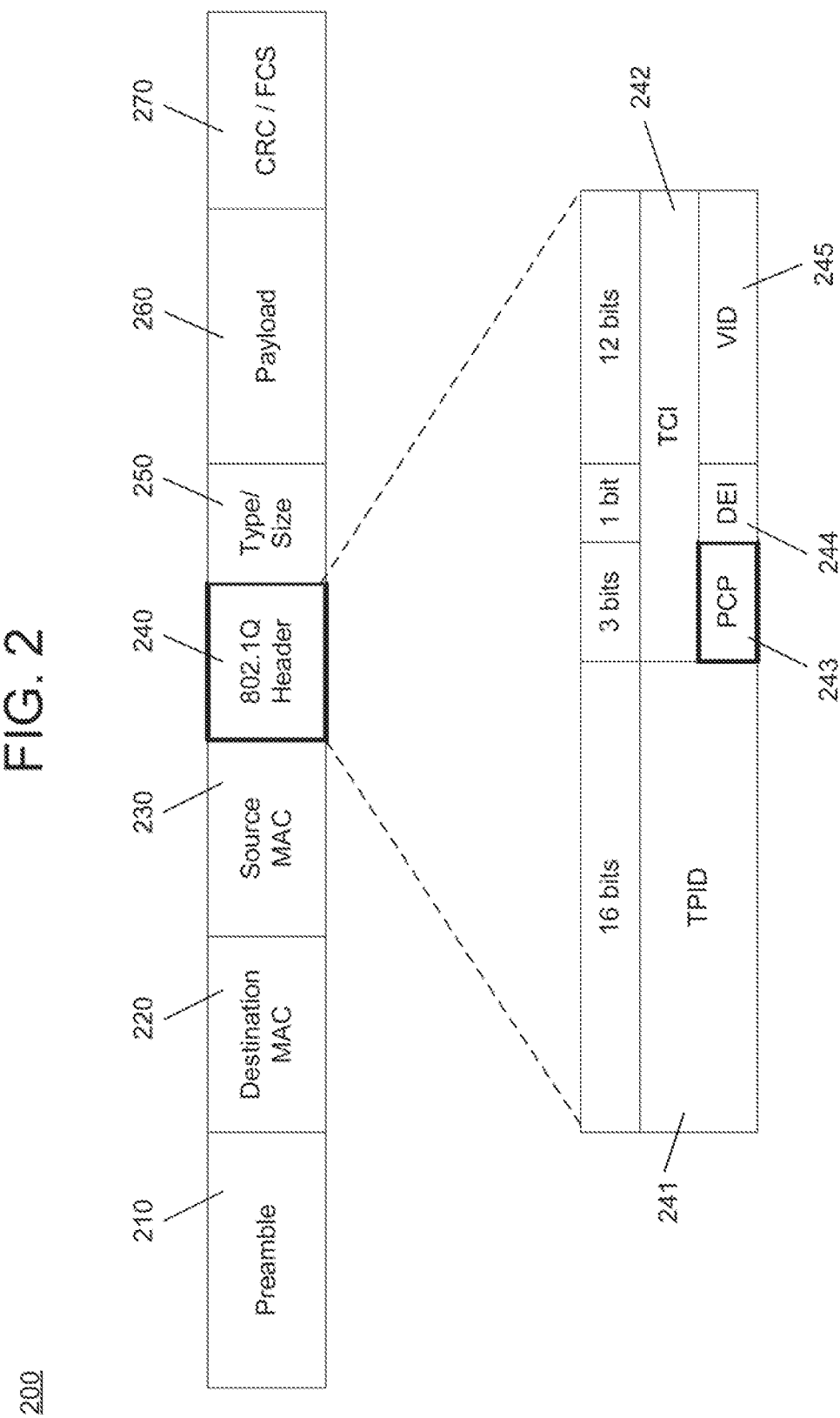

FIG. 3C

| Current Bandwidth Allocation | 350 |
|---|---|
| Tag ID | Bandwidth |
| 1 | 1.22 Gb/s |
| 2 | 2.57 Gb/s |
| 3 | 5.15 Gb/s |
| 4 | 10.33 Gb/s |
| 5 | 25.74 Gb/s |
| 6 | 50.36 Gb/s |
| 7 | 100.00 Gb/s |

352

354

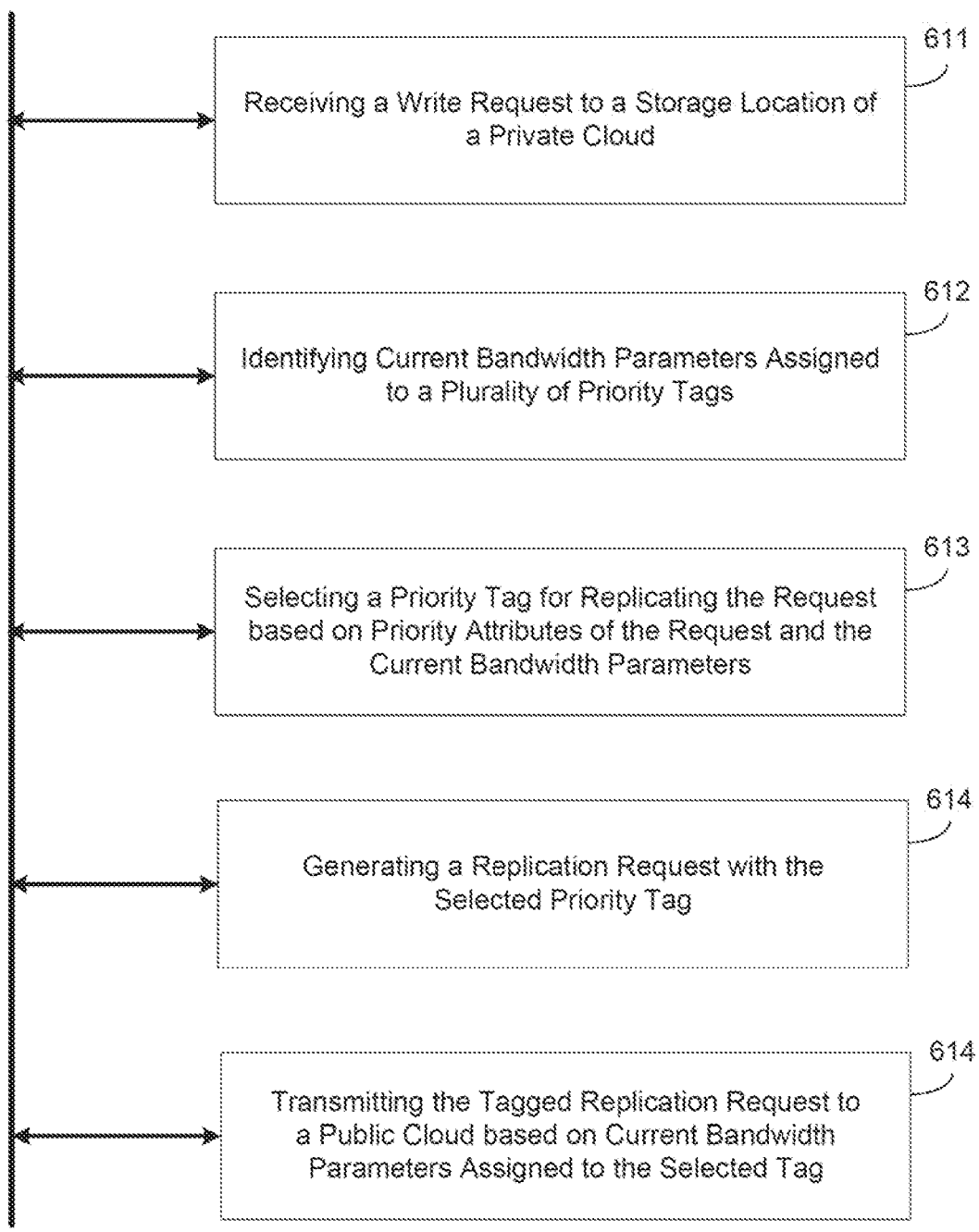

PRIORITIZING DATA REPLICATION PACKETS IN CLOUD ENVIRONMENT

BACKGROUND

In a hybrid cloud environment, a customer's on premises site, services, applications, etc., may be hosted in a private cloud instance. Meanwhile, a public cloud instance may be used as a backup site (e.g., for purposes of disaster recovery, etc.) In this scenario, data that is stored within the private cloud instance should be synchronized with (backed up to) the public cloud instance. This process may be referred to as Internet protocol (IP)-based replication. Replication between the private cloud instance and the public cloud instance is typically performed synchronously. In this case, when a new write request is received from an application at the on-premises site (private cloud instance), the replication manager may send the write request to the public cloud instance, as well. The write request is not marked "completed" until both the private cloud instance and the public cloud instance have acknowledged the update. This requires the cloud platform to wait for both the private cloud instance and the public cloud instance to be updated before the write request in the private cloud instance can be completed.

SUMMARY

One example embodiment provides an apparatus that includes a processor configured to one or more of receive a request from a software application to write data to a storage location of a private cloud that hosts the software application, identify storage attributes of the storage location of the private cloud, generate a replication request to replicate the data over a network to a public cloud, and embed a priority tag into the replication request based on the identified storage attributes of the storage location of the private cloud, and a network interface configured to transmit the tagged replication request over the network from the private cloud to the public cloud based on a bandwidth assigned to the embedded priority tag.

Another example embodiment provides a method that includes one or more of receiving a request from a software application to write data to a storage location of a private cloud that hosts the software application, identifying storage attributes of the storage location of the private cloud, generating a replication request for replicating the data over a network to a public cloud, embedding a priority tag into the replication request based on the identified storage attributes of the storage location of the private cloud, and transmitting the tagged replication request over the network from the private cloud to the public cloud based on a bandwidth assigned to the embedded priority tag.

A further example embodiment provides a non-transitory computer-readable medium comprising instructions, that when read by a processor, cause the processor to perform one or more of receiving a request from a software application to write data to a storage location of a private cloud that hosts the software application, identifying storage attributes of the storage location of the private cloud, generating a replication request for replicating the data over a network to a public cloud, embedding a priority tag into the replication request based on the identified storage attributes of the storage location of the private cloud, and transmitting the tagged replication request over the network from the private cloud to the public cloud based on a bandwidth assigned to the embedded priority tag.

Another example embodiment provides an apparatus that includes a processor configured to one or more of receive a request from a software application to write data to a storage location of a private cloud that hosts the software application, identify current bandwidth parameters assigned to a plurality of priority tags, select a priority tag based on priority attributes of the request and the current bandwidth parameters assigned to the plurality of tags, and generate a replication request with the selected priority tag, and a network interface configured to transmit the replication request over the network from the private cloud to the public cloud based on current bandwidth parameters assigned to the selected priority tag.

Another example embodiment provides a method that includes one or more of receiving a request from a software application to write data to a storage location of a private cloud that hosts the software application, identifying current bandwidth parameters assigned to a plurality of priority tags, selecting a priority tag for replicating the request based on priority attributes of the request and the current bandwidth parameters assigned to the plurality of tags, generating a replication request with the selected priority tag, and transmitting the replication request over the network from the private cloud to the public cloud based on current bandwidth parameters assigned to the selected priority tag.

BRIEF DESCRIPTION OF THE DRAWINGS

FIG. 2 is a diagram illustrating a data frame with a priority tag embedded therein in accordance with an example embodiment.

FIG. 3C is a diagram illustrating an example of bandwidth allocations to priority tags in accordance with an example embodiment.

FIGS. 6A and 6B are diagrams illustrating methods of replicating data in a cloud environment in accordance with an example embodiment.

DETAILED DESCRIPTION

Figure 1A:
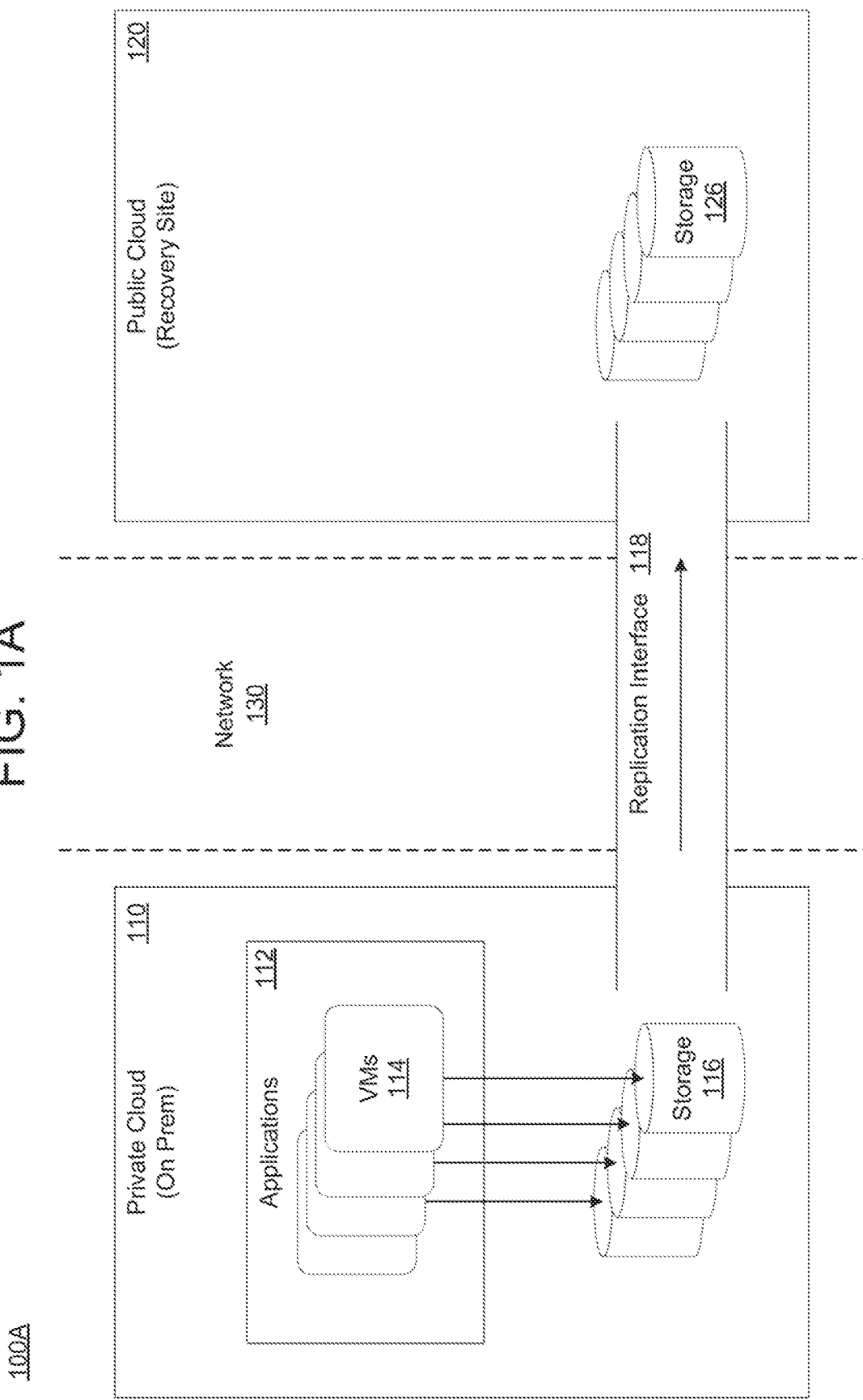
FIGS. 1A-1B are diagrams illustrating a cloud environment for data replication in accordance with example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer-readable media, devices, and/or networks, which are directed to controlling the flow of data between a private cloud environment and a backup recovery site (e.g., a public cloud environment, etc.) based on current network conditions. In particular, a cloud orchestration layer may include a process that "tags" data packets being transmitted from the private cloud environment to the public cloud environment. The tags, also referred to herein as priority tags, may be allocated/assigned a particular amount of network bandwidth by a cloud provider which updates the network bandwidth assignments dynamically over time based on current network conditions. For example, a cloud provider may update the bandwidth assigned to each tag on an hourly basis, a daily basis, in response to a change in network conditions, or the like.

Hybrid cloud is a platform for applications and infrastructure, built on two or more components from public cloud, private cloud, and on-premises information technology (IT). In all its forms, hybrid cloud facilitates flexibility and portability for applications and data. Hybrid cloud is a computing environment that connects a company's on-premises private cloud services and third-party public cloud into a single, flexible infrastructure for running the organization's applications and workloads. The principle behind hybrid cloud is that it is a mix of public and private cloud resources with a level of orchestration between them which gives an organization the flexibility to choose the optimal cloud for each application or workload (and to move workloads freely between the two clouds as circumstances change). This enables the organization to meet its technical and business objectives more effectively and cost-efficiently than it could with public or private cloud alone. This provides the flexibility of the cloud, as well as preservation of on-premises data sites for data protection and resiliency activity.

Such a hybrid cloud environment can be used to run sensitive, highly regulated, and mission-critical applications and workloads or workloads with reasonably constant performance and capacity requirements. The combination of private cloud infrastructure as well as the public cloud recovery site provides flexibility and geo-separation and ensures protection of the data over the long term. Another benefit of the hybrid cloud is that less-sensitive, more-dynamic, or temporary workloads can be run at the public cloud that enables better test infrastructure without additional hardware provisioning at the on-premises site of the private cloud and overall cost effectiveness can be achieved.

In a hybrid cloud deployment, a customer can migrate data between on-premises data centers stored in a private cloud and a backup recovery site at a public cloud using real-time replication over IP. Using IP replication, data can be migrated permanently or temporarily to the public cloud. Data can be replicated asynchronously or synchronously to enable disaster recovery or workload migration between on-premises data centers. This cloud-based virtualization process enables efficient block-based computing on the cloud which provides the flexibility to store, manage and retrieve the block data from cloud and allows block storage to use advanced cloud features like availability, dynamic access and usage flexibility.

In such type of hybrid cloud implementation where the replication services are configured between public and private cloud locations, data written to the private cloud needs to be replicated to the secondary location (public cloud) in case of a disaster or other failure. There are different types of IP based replications that can be created between the on-premises data and applications and the backup site at the public cloud. One of the common approaches is to create synchronous replication between the entities to ensure primary and auxiliary data is always in sync. This ensures the data is replicated consistently to the secondary site before sending an acknowledgment to the host application that requested the write.

When any new write request comes to the cloud virtualization system, it first checks the replication requirement. In case the synchronous replication is activated on the volume where the data need to be saved, then it sends the data to the public cloud instance in parallel while saving data at the private cloud location. Once the data is written to both the locations, then this operation is marked as completed and an acknowledgement is sent to the host application that initiated the write request. One of the major advantages of this synchronous replication is both the sites will always have consistent data.

However, there are multiple types of disks and various price performance characterized storage which are virtualized at the private and public cloud locations and which are used to save the data. Hence, the data latency characteristics for each of the storage type is different. In some cases, there may be resource throttling limits applied on the applications or the data volumes (e.g., Persistent Volume Claims (PVCs), etc.) at the cloud orchestration layer. As the incoming data is sent to the cloud instance via a networked infrastructure, there is no way today by which the networked infrastructure can know about the transmission characteristics of the data which is requested for transmission from the private cloud to the public cloud which creates performance penalties for applications that issue write requests to the on-premises data and services hosted on the private cloud.

For example, the private cloud may be the faster performing location with respect to the public cloud. Here, the customer may have paid for a low latency requirement at the private cloud. In this example, the data may be stored at the fastest performing location (private cloud) without any throttling values configured. To ensure disaster recovery coverage, the synchronous replication may be configured between the private and public cloud instances. In this case, when the application issues write instructions, it first comes to the cloud orchestration which then checks for the replication requirement and the base location at which the write request is to be stored at the private cloud. Because the replication is enabled, the orchestration layer sends the data to the network for the recovery site at the public cloud to save the data.

In this example, while sending the data, a common communication link (replication interface) between the private cloud and the public cloud is used for all the applications and all write requests which are received. Thus, each application is typically treated the same for purposes of priority/bandwidth when transferring data from the private cloud to the public cloud. In this example, the data at the private cloud is at the faster location with the faster processing speed. Likewise, the public cloud may also be configured for faster processing speed just the same as the private cloud. However, there is no network priority for the packets to ensure they will reach the target on-time. Or, in case of cloud network congestion, these packets may suffer the delay as all other packets. The current existing available flow control mechanisms do not allow for prioritizing packets transferred via the replication interface between private cloud and the public cloud. Thus, even if the customer has paid for low latency at the private cloud and the public cloud locations, performance may struggle and network delays may still occur as a result of the network congestion between the private cloud environment and the public cloud environment.

To address these deficiencies in the art, the example embodiments provide a tagging process that operates in conjunction with a replication manager of the cloud platform. The process may add a tag (e.g., a priority code point (PCP) tag, etc.) to a header of a data packet being transferred via the replication interface between the private and public cloud instances thereby enabling the data packet to be prioritized based on latency requirements of the application and the storage location where the data is written in the private cloud. For example, a data packet of a mission critical application may be given a higher priority tag than another non-mission critical data packet, thereby giving more bandwidth to mission critical applications and other applications that require low latency.

When data is written to the private cloud, the cloud may perform the traditional secondary write process to the backup site (private cloud). In the example embodiments though, the process may tag some packets with tags that distinguish the packets as having a greater priority to dynamically control the amount of network bandwidth that is given to the packets when transferring the packets from the private cloud to the public cloud. This process can help ensure that the latency of the application is not delayed by the transfer of the packets from the private cloud to the public cloud. In other words, the amount of bandwidth assigned to the packets can be dynamically determined/updated by the cloud replication manager based on current network conditions. Here, the cloud may wait for the write request to be processed at the recovery site before acknowledging the write request and completing the write request at the private cloud. However, because the packets may be prioritized between the private cloud and the public cloud, the amount of delay created by backing up the write operation to the recovery site can be significantly reduced. Thus, the application's latency requirements, jitter requirements, etc. can be maintained.

Priority tags such as PCP tags are typically assigned static bandwidth values that remain constant regardless of the status of the network. This can cause issues when network congestion occurs, because the amount of bandwidth available may not be enough to handle the assigned traffic. In the example embodiments, the bandwidth that is assigned to each of the priority tags may be updated dynamically and on a continuing basis by the cloud provider or other infrastructure. The updates can factor into consideration the current network conditions. Thus, the tags that are assigned to the packets are based on real-time network bandwidth assignments that can prevent issues in times of greater network congestion.

According to various embodiments, a tagging process may query the cloud provider for storage attributes of the different storage volumes at the private cloud. For example, when a write request is received, the tagging process may query the cloud provider for storage attributes of the storage location where the data of the write request is to be written. Here, each type of storage provided by the private cloud instance may add various latency to packet data as it is written. For example, solid state disk (SSD) data may have the lowest latency thresholds while hard disk data may have the greatest latency thresholds. As another example, the tagging process may query the cloud provider for latency attributes/thresholds of the application that submitted the request. Here, the latency added by the storage location and/or the latency requirements of the application that submitted the write request may be identified from the data collected by the tagging process.

The cloud provider (or other entity) may also assign bandwidth values/ranges of network consumption for each tag among the plurality of tags. As an example, the plurality of tags may include seven tags, but embodiments are not limited thereto. Each tag may be assigned a different bandwidth or range of bandwidth. These bandwidths may be continuously updated by the cloud provider (or other entity) over time.

Here, the tagging process may query the cloud provider, or other entity, for real-time bandwidth values that are currently assigned to the priority tags. Thus, the tagging process may obtain, in real-time, the attributes of the storage location/application of the write request in the private cloud, and the current priority tag bandwidth assignments. With this information, the tagging process can select a tag from among the plurality of priority tags based on the attributes of the storage location/application to ensure that the network delay/latency when delivering the packet to the public cloud does not exceed the latency requirements of the storage location/application.

The write process at the private cloud instance may require an acknowledgment that the write request is performed at the public cloud instance before the private cloud marks the write request as complete. However, in the example embodiments, some packets may be prioritized over other packets based on priority tags such that some packets are given bandwidth preferences/priority over other packets and network delay can be prevented for mission critical applications and other applications having low latency requirements.

Figure 1B:
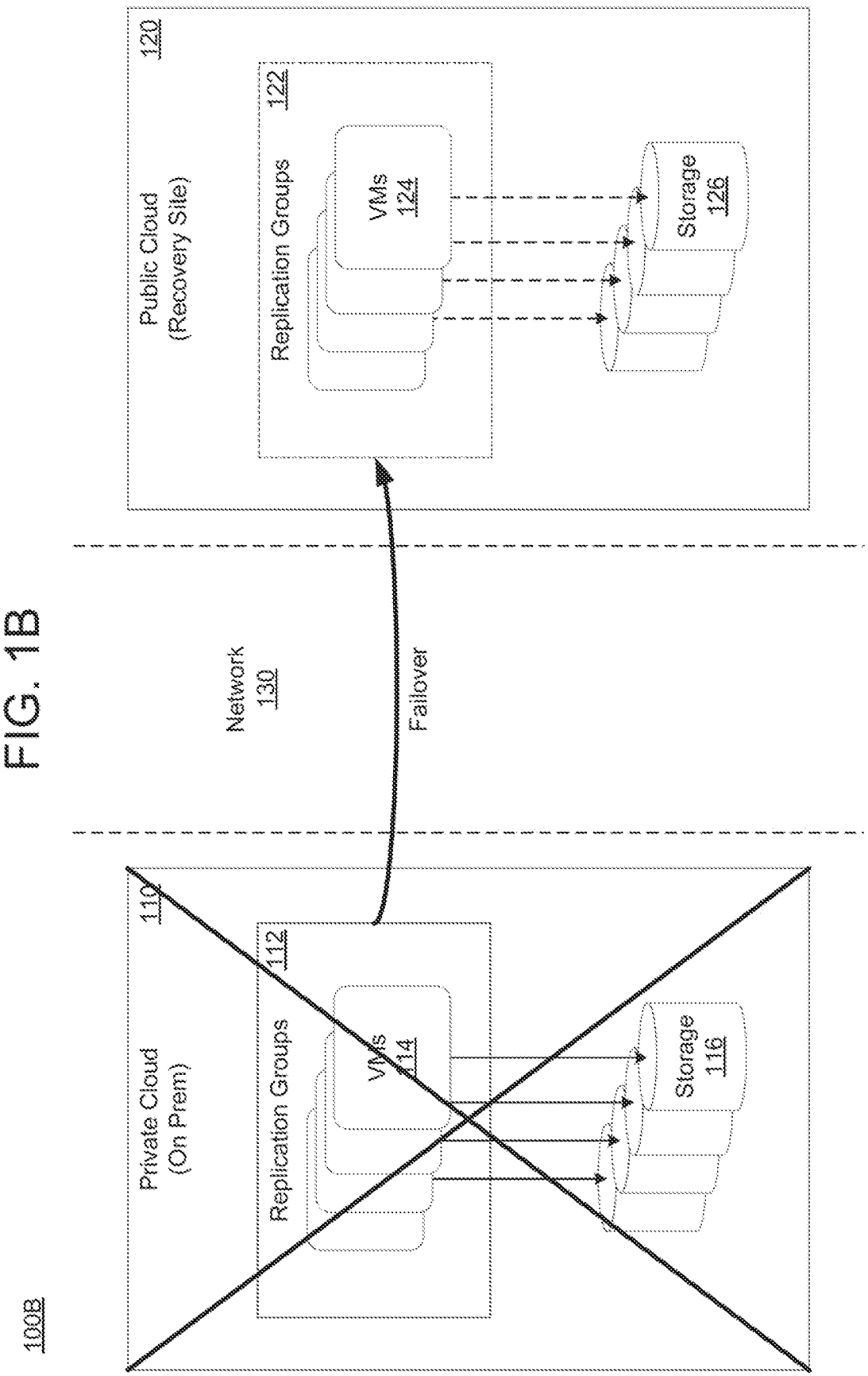

FIGS. 1A and 1B illustrate a cloud environment 100A and 100B, respectively, for data replication in accordance with example embodiments. Referring to FIG. 1A, the cloud environment 100A includes a private cloud instance 110 and a public cloud instance 120. Here, the private cloud instance 110 and the public cloud instance 120 are separated/connected by a network 130 such as the Internet, a private network, a combination thereof, etc. In this example, the private cloud instance 110 hosts applications 112 and data of a customer. Therefore, the private cloud instance 110 is the primary storage location for input/output (IO) requests from the hosted applications. Meanwhile, the public cloud instance 120 in this example is the host of a recovery site for the primary storage of the private cloud instance 110.

As an example, the private cloud instance 110 and the public cloud instance 120 may be hosted at different data centers and geographies and separated by a network of computing nodes included within the network 130. To backup data on the private cloud instance 110, the data may be sent from the private cloud instance 110, across the network 130, to the public cloud instance 120. In this environment, delays may occur when requests are sent from the private cloud to the public cloud as a result of network traffic, outages, etc.

The applications 112 may be hosted within virtual machines 114 running in the private cloud instance 110. The applications 112 may read, write, update, delete, etc. data stored in a data store (not shown). When data is written to storage 116 of the private cloud instance 110 by an application from among the applications 112, for example, via a storage request, a replication manager (not shown) may establish a replication channel 118 for transferring the data to a corresponding storage 126 of the public cloud instance 120. Thus, the write operation can be performed at the same time in both the private cloud instance 110 and the public cloud instance 120. When both write operations have been completed, and the data has been successfully replicated, the private cloud instance 110 may inform the corresponding application of the successful performance of the write operation.

The cloud environment 100B shown in FIG. 1B illustrates the cloud environment 100A shown in FIG. 1A after a failure has occurred at the private cloud instance 110. In this case, a cloud orchestration (not shown) may temporarily or permanently transfer the primary host location of the customer from the private cloud instance 110 to the public cloud instance 120, until the issues/failures are resolved. As shown in FIG. 1B, the VMs 114 and the applications 112 being hosted by the VMs 114 may be migrated to application instances 122 and VMs 124 hosted by the public cloud instance 120. Here, the application instances 122 may access the previously-stored data in the storage 126 which is synchronized with the storage 116 of the private cloud instance 110 by the replication process described in FIG. 1A. Thus, the customer will not experience a significant delay because of the failure at the private cloud instance 110.

FIG. 2 illustrates a data frame 200 with a priority tag embedded therein in accordance with an example embodiment. For example, the data frame 200 may be a data frame that adheres to the Institute of Electrical and Electronics Engineers (IEEE) 802.1Q protocol, but embodiments are not limited thereto. IEEE 802.1Q is the networking standard that supports virtual local area networks (VLANs) on an IEEE 802.3 Ethernet network. The standard defines a system of VLAN tagging for Ethernet frames and the accompanying procedures to be used by bridges and switches in handling such frames. The standard also contains provisions for a quality-of-service-prioritization scheme commonly known as IEEE 802.1p and defines the Generic Attribute Registration Protocol.

The data frame 200 may have a format as shown in FIG. 2 including a preamble 210, a destination media access control (MAC) address 220, a source MAC address 230, a header 240 (also referred to herein as a tag), an EtherType field 250, a payload 260, a cyclic redundancy check (CRC)/frame check sequence (FCS) field 270, and the like. Here, 802.1Q includes a 32-bit header 240 between the source MAC address 230 and the EtherType field 250 of the data frame 200 which can be used for tagging data packets between the private cloud and the public cloud, such as the data frame 200. Under 802.1Q, the maximum frame size is extended from 1,518 bytes to 1,522 bytes. The minimum frame size remains 64 bytes, but a bridge may extend the minimum size frame from 64 to 68 bytes on transmission. This allows for the tag without additional padding. Two bytes are used for the tag protocol identifier (TPID) field 241, the other two bytes for tag control information (TCI) field 242. The TCI field 242 is further divided into a priority code point (PCP) field 243, a drop eligible indicator (DEI) field 244, and a VLAN identifier (VI) field 245.

The TPID field 241 is a 16-bit field that may be set to a value of 0x8100 in order to identify the frame as an IEEE 802.1Q-tagged frame. This field is located at the same position as the EtherType field 250 in untagged frames, and is thus used to distinguish the frame from untagged frames. The TCI field 242 is a 16-bit field containing the three sub-fields including the PCP field 243, the DEI field 244, and the VI field 245. Here, the PCP field 243 is a 3-bit field which refers to the IEEE 802.1p class of service and maps to the frame priority level. Different PCP values can be used to prioritize different classes of traffic. Furthermore, in the example embodiments, the PCP values may be dynamically updated such that the bandwidth values assigned to each PCP tag represent the real-time conditions of the network. The DEI field 244 is 1-bit field which may be used separately or in conjunction with PCP field 243 to indicate frames eligible to be dropped in the presence of congestion.

The VI field 245 is a 12-bit field specifying the VLAN to which the frame belongs. The values of 0 and 4095 (0x000 and 0xFFF in hexadecimal) are reserved. All other values may be used as VLAN identifiers, allowing up to 4,094 VLANs. The reserved value 0x000 indicates that the frame does not carry a VLAN ID. In case the reserved value is used, the 802.1Q tag specifies only a priority (in PCP and DEI fields) and is referred to as a priority tag. The IEEE 802.3ac standard increased the maximum Ethernet frame size from 1518 bytes to 1522 bytes to accommodate the four-byte VLAN tag used by the example embodiments.

The example embodiments are directed to a system (e.g., service, process, program, etc.) that can be integrated with or run in conjunction with a cloud replication manager running in a cloud platform and perform dynamic flow control tagging for cloud ethernet packets (e.g., having a format of the data frame 200 shown in FIG. 2, etc.) which are identified for replication with a public cloud. The system can provide better application performance for mission critical applications and other applications that require low latency and/or significant bandwidth. The system may include a process running in conjunction with the replication manager at a cloud orchestration, which collects replication configuration requirements of an application and priority tag values which are configured via the network. Furthermore, the system may tag data packets that are transmitted from the private cloud to the public cloud for purposes of replication with a priority tag that the rest of the network adheres to. As an example, the priority tag may be a value that is stored in the PCP field 243 shown in FIG. 2 but embodiments are not limited thereto.

Figure 3A:
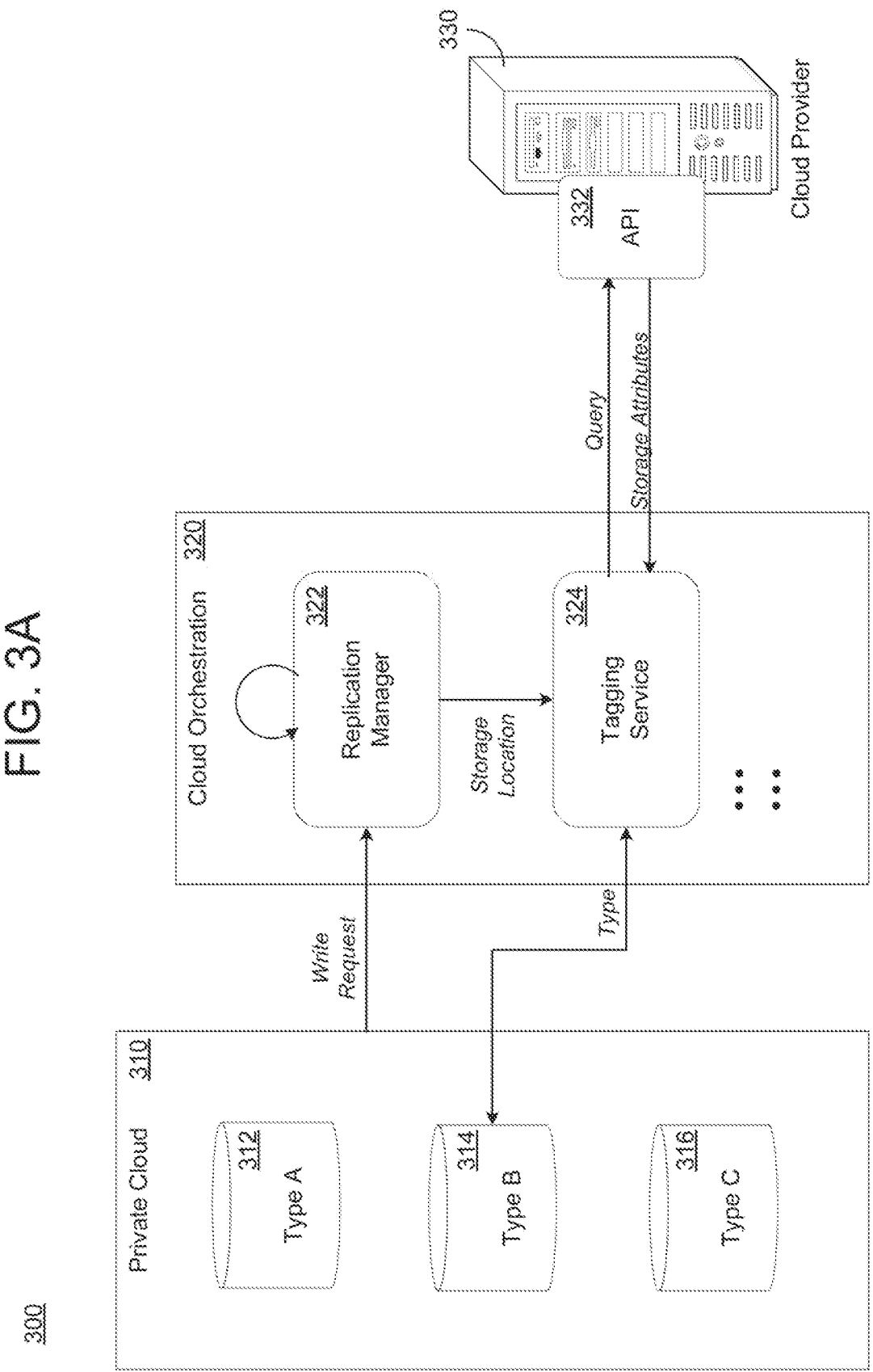
FIG. 3A is a diagram illustrating a process of querying a provider for storage location attributes in accordance with an example embodiment.

FIG. 3A illustrates a process 300 of querying a cloud provider 330 for storage location attributes of a data packet in accordance with an example embodiment. Referring to FIG. 3A, a private cloud 310 hosts a plurality of software applications (not shown). Here, the private cloud 310 provides three different storages 312, 314, and 316, for storing the application data. Each storage 312, 314, and 316 may have different latency requirements, jitter requirements, etc. For example, storage types may include solid state disk (SSD), hard disk, random-access memory (RAM), database, and the like. Applications may read and write data to the three different storages 312, 314, and 316. The read and write requests can be forwarded to a cloud orchestration layer 320 which includes a replication manager 322.

When the orchestration layer receives a data packet that is part of a write request at the private cloud 310, the replication manager 322 identifies that the write operation is being performed, and therefore identifies the packet as being a packet for replication to a recovery site. Here, the replication manager 322 may notify a tagging process 324 of the write request. In response, the tagging process 324 may identify a storage location of the respective data of the write request at primary location (e.g., the private cloud 310) and query the virtualized environment based on the storage location.

For example, the tagging process 324 may query a cloud provider system 330 via an application programming interface (API) 332, and retrieve the storage characteristics for the identified storage location and bandwidth characteristics for the applications hosted within the private cloud 310. In response, the tagging process 324 may receive attributes of the storage location, for example, logical block addresses (LBAs), private cloud instance space claims, speed requirements of the storage, etc. The tagging process 324 may also receive application data such as latency requirements, jitter requirements, and the like of the applications. The virtualized environment may include multiple disks and multiple types of storage that offer varying degrees of speed, etc. which can influence the latency of the packets submitted to the applications hosted therein. By querying the cloud provider 330 for the storage location attributes and the latency attributes of the applications, the tagging process 324 can identify priorities amongst the different applications and data requests.

Figure 3B:
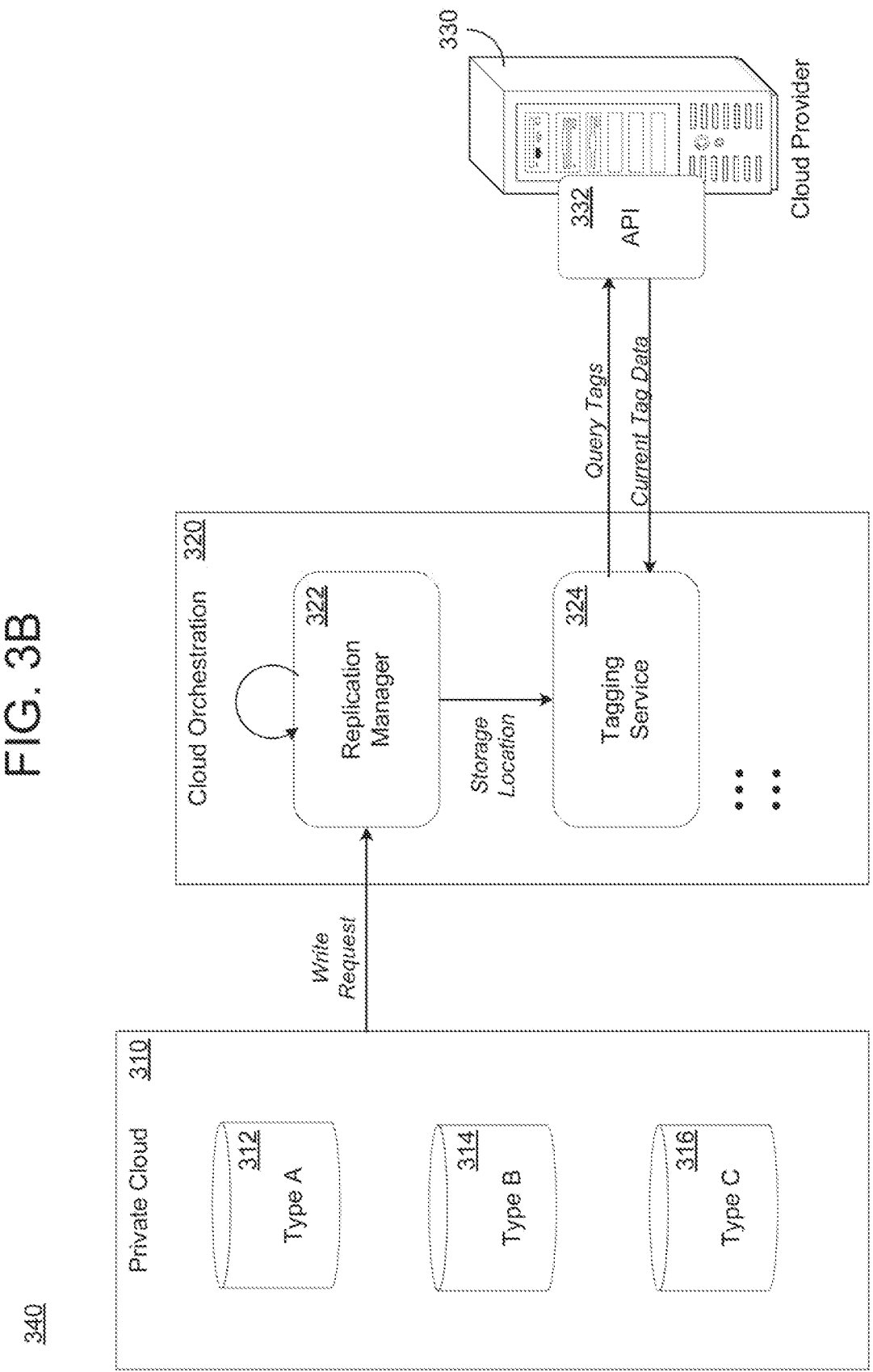
FIG. 3B is a diagram illustrating a process of querying a provider for current tag bandwidth assignments in accordance with an example embodiment.

FIG. 3B illustrates a process 340 of querying the cloud provider 330 for current tag bandwidth assignments in accordance with an example embodiment, and FIG. 3C illustrates an example of a table 350 of current bandwidth allocations assigned to priority tags, in accordance with an example embodiment. For example, the process 340 in FIG. 3B may return the table 350 shown in FIG. 3C. Referring to FIG. 3B, the tagging process 324 may query the cloud provider 330 for tag attributes that are currently assigned to each priority tag among a plurality of priority tags, for example, PCP tags. In this example, the tagging process 324 receives the table 350 shown in FIG. 3C, which includes a plurality of rows corresponding to a plurality of current bandwidth-to-tag assignments which each include a tag identifier field 351 and a bandwidth value field 352. The tag identifier field 351 identifies the priority tag by its number and the bandwidth value field 353 identifies the bandwidth allocated to the paired priority tag.

Accordingly, the tagging process described herein may query the cloud provider 330 as well as other entities for storage latency attributes, application attributes, and the up-to-date tag attributes. In FIGS. 3A and 3B, the querying is performed via the AP 332, which may include multiple different APIs. Furthermore, in the example embodiments, the tagging process 324 is illustrated as a separate process but it may be integrated into another application such as the replication manager or the like.

To perform the tagging operation, the tagging process 324 may determine a priority tag to embed into a data packet of the write request, and in one example, a PCP value that can be embedded within an 802.1Q header of an Ethernet frame. The tagging process 324 may include logic encoded therein which selects a priority tag for the data packet from among a plurality of priority tags based on the storage latency attributes, the application latency requirements, and the current/up-to-date bandwidth values assigned to the priority tags. As an example, there may be seven possible priority tags and the tagging process 324 may select one of these priority tags to add to the data packet.

Figure 4:
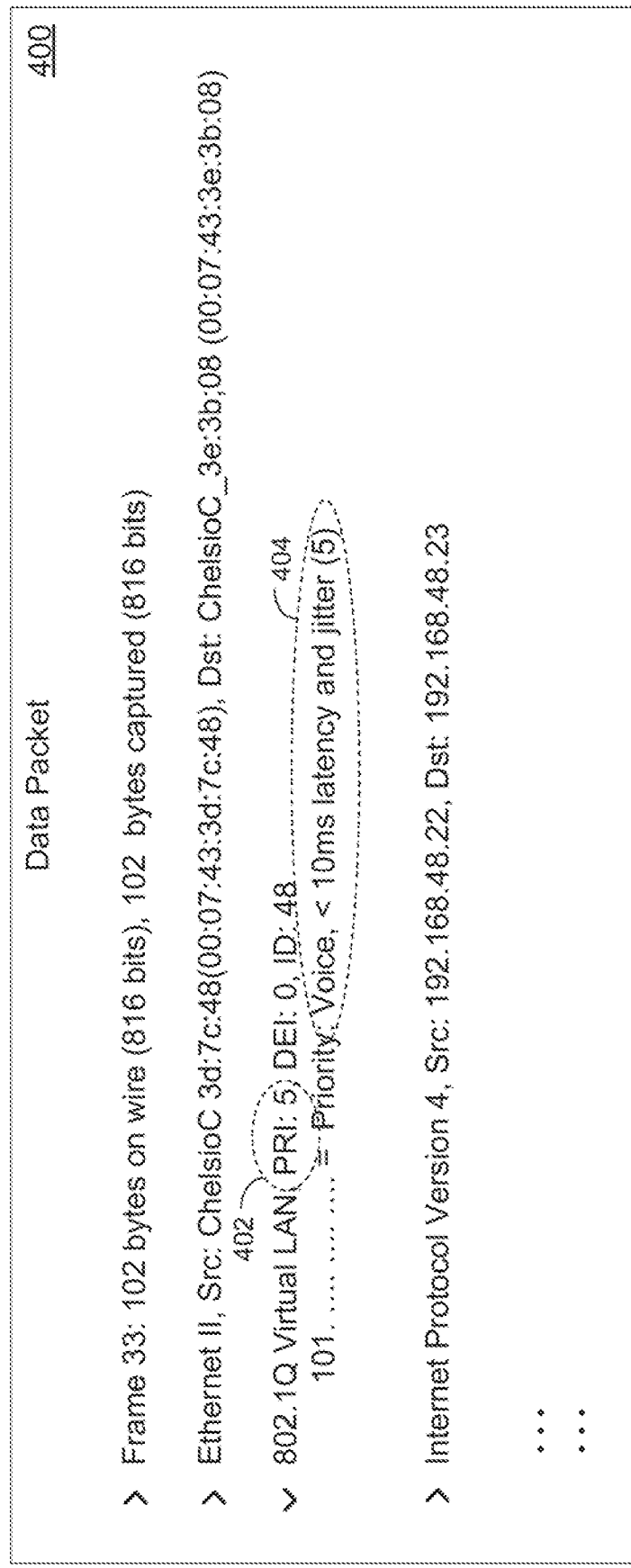
FIG. 4 is a diagram illustrating a process of tagging a data packet with a priority tag in accordance with an example embodiment.

FIG. 4 illustrates a data packet 400 that has a priority tag 402 that has been added within the 802.1Q field in accordance with an example embodiment. Referring to FIG. 4, the data packet 400 may include a frame identifier, an amount of data being provided by the frame, a source MAC, a destination MAC, and the like. In addition, the data packet 400 may include the priority tag 402 and the latency data 404 added to the tag portion of the data packet 400 which in this example is the 802.1Q field of the data packet 400. The priority tag 402 may be known by the other participants within a computing network between the private cloud and the public cloud. Thus, the priority tag 402 can be used to control/configure how the data packet 400 is routed through the network from the private cloud to the public cloud. Furthermore, the latency data 404 may provide additional data values such as required latency thresholds, jitter thresholds, and the like, of the application, data request, etc.

Figure 5:
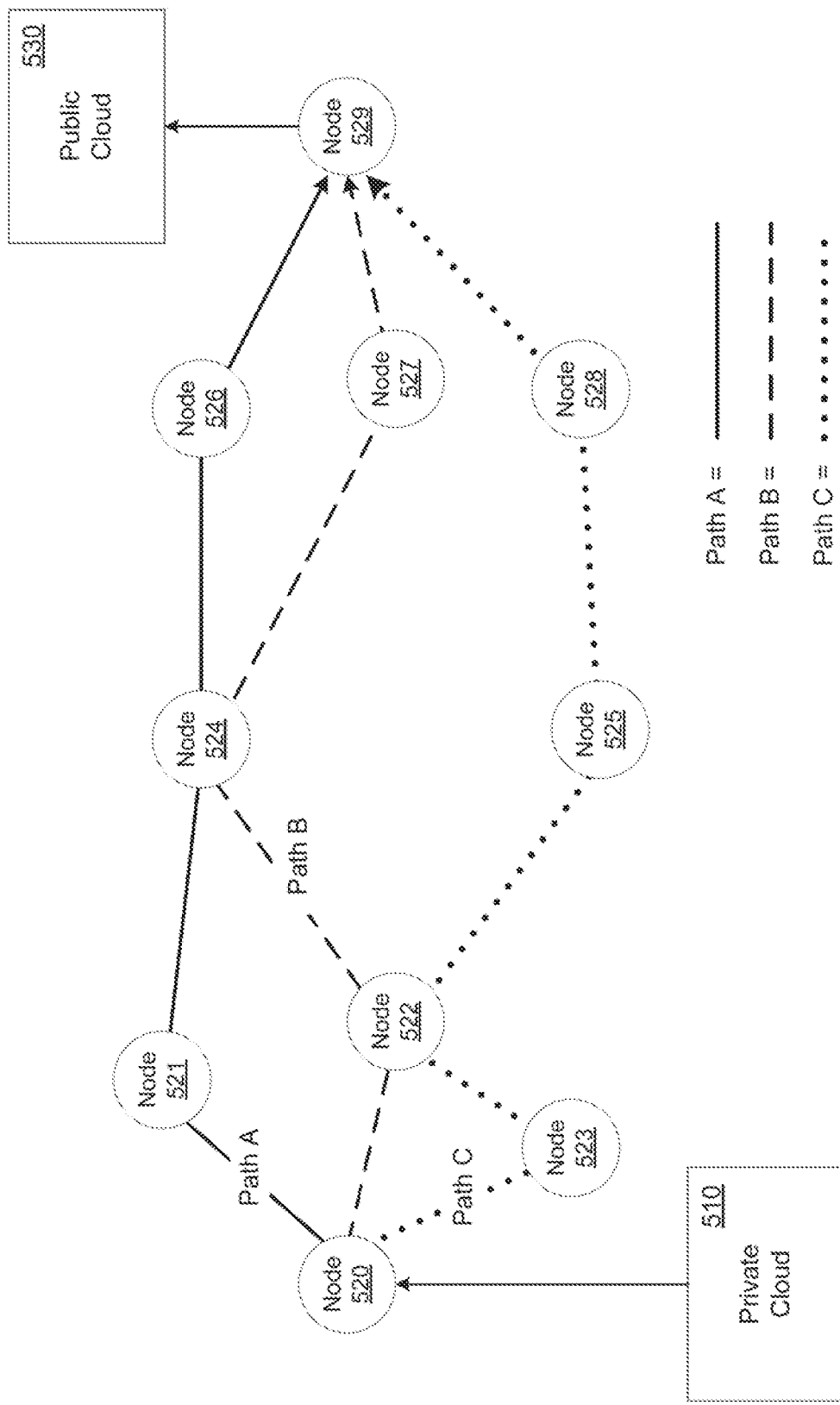
FIG. 5 is a diagram illustrating a process of selecting a navigational path based on a priority tag in accordance with an example embodiment.

FIG. 5 illustrates a process 500 of selecting a network path for a data packet based on a priority tag in accordance with an example embodiment. In this example, a private cloud 510 and a public cloud 530 are interconnected via a plurality of nodes 520-529 of a network. Here, the plurality of nodes 520-529 may be routers, switches, servers, gateways, or the like. In this example, three predefined paths (Path A, Path B, Path C) exist between the private cloud 510 and the public cloud 330. When a first node 520 receives a write replication packet from the private cloud 510, the first node 520 detects a priority tag value added to the data packet and maps it to a bandwidth allocation in the table 350, or the like. Then, the first node 520 selects one of the three paths based on this mapping process and the current bandwidth characteristics of the three paths. The selected path is then followed by the remaining nodes until the packet reaches its intended destination of the public cloud 530.

Figure 6A:
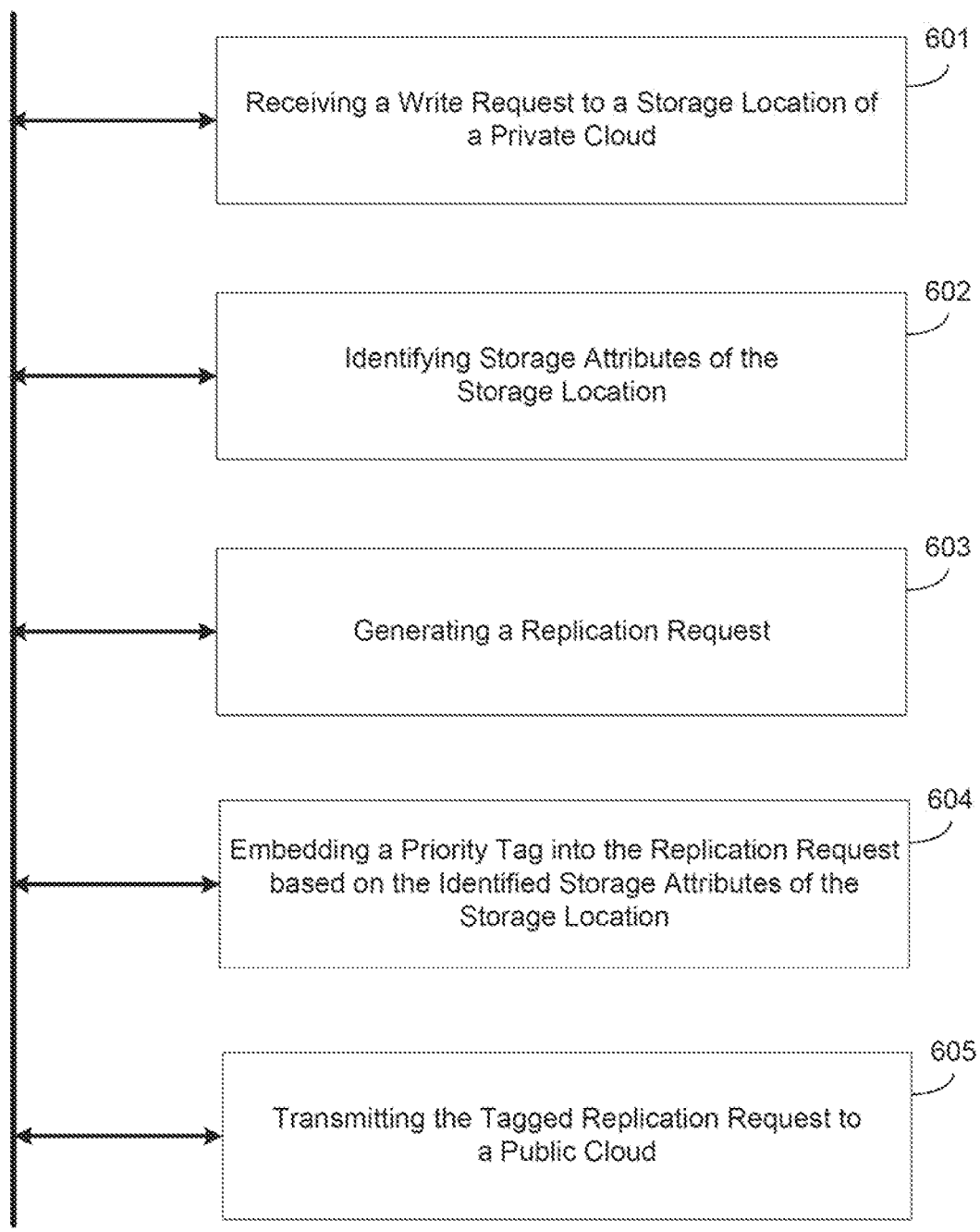

FIG. 6A illustrates a method 600 of replicating data in a cloud environment in accordance with an example embodiment. For example, the method 600 may be performed by a host platform such as a cloud platform, a web server, a database node, a distributed computing system, a combination thereof, and the like. Referring to FIG. 6A, in 601, the method may include receiving a request from a software application to write data to a storage location of a private cloud that hosts the software application. For example, the request may be a write request for writing data (e.g., modifying data, deleting data, updating data, writing new data, etc.) to the storage location of the private cloud. Here, the private cloud may have multiple different types of storages having different latency attributes, jitter attributes, and other attributes.

In 602, the method may include identifying storage attributes of the storage location of the private cloud. For example, latency attributes, volume, jitter attributes, available space, and the like, may be identified of the storage location. In 603, the method may include generating a replication request for replicating the data over a network to a public cloud. Here, the replication request may include writing the same data to a public cloud where the private cloud is backed-up. In 604, the method may include embedding a priority tag into the replication request based on the identified storage attributes of the storage location of the private cloud. In 605, the method may include transmitting the tagged replication request over the network from the private cloud to the public cloud based on a bandwidth assigned to the embedded priority tag. For example, the storage attributes may also be related to.

In some embodiments, the attributes of the storage location of the private cloud may include bandwidth allocation attributes, jitter attributes, latency attributes, and the like, and the method may further include selecting the priority tag from among a plurality of predefined priority tags based on the bandwidth allocation attributes for the storage location. In some embodiments, the transmitting may include transmitting the tagged replication request via a replication interface between the private cloud and the public cloud based on a bandwidth assigned to the embedded priority tag. In some embodiments, the method may further include determining current network bandwidth parameters for each of a plurality of predefined priority tags, and selecting the priority tag from the plurality of predefined priority tags based on the current network bandwidth parameters for each of the plurality of predefined tags.

In some embodiments, the private cloud may include a host environment of the software application and the public cloud comprises a backup recovery location for data of the software application. In some embodiments, the identifying may include querying an application programming interface (API) of a cloud provider of the private cloud for the attributes of the storage location. In some embodiments, the embedding may include embedding a priority code point (PCP) tag into a header of a data packet.

FIG. 6B illustrates a method 610 of replicating data in a cloud environment in accordance with another example embodiment. For example, the method 610 may be performed by a host platform such as a cloud platform, a web server, a database node, a distributed computing system, a combination thereof, and the like. Referring to FIG. 6B, in 611, the method may include receiving a request from a software application to write data to a storage location of a private cloud that hosts the software application. For example, the request may be a write request for writing data (e.g., modifying data, deleting data, updating data, writing new data, etc.) to the storage location of the private cloud. Here, the private cloud may have multiple different types of storages having different latency attributes, jitter attributes, and other attributes.

In 612, the method may include identifying current bandwidth parameters assigned to a plurality of priority tags. The bandwidth parameters may be updated by the providers of the cloud environment over time. That is, the bandwidth parameters assigned to each tag may be dynamically updated by the cloud provider over time and queried by the private cloud environment, for example, via the process included in the orchestration layer of the cloud which is described herein. In 613, the method may include selecting a priority tag for replicating the request based on priority attributes of the request and the current bandwidth parameters assigned to the plurality of tags. In 614, the method may include generating a replication request with the selected priority tag. In 615, the method may include transmitting the replication request over the network from the private cloud to the public cloud based on current bandwidth parameters assigned to the selected priority tag.

In some embodiments, the transmitting may include transmitting the replication request via a replication interface between the private cloud and the public cloud based on the current bandwidth parameters assigned to the selected priority tag. In some embodiments, the identifying may include querying an application programming interface (API) of a cloud provider of the private cloud for the current bandwidth parameters assigned to the plurality of priority tags. In some embodiments, the plurality of priority tags may include a plurality of point code priority (PCP) tags which prioritize a plurality of classes of network traffic with respect to each other. In some embodiments, the selecting may further include selecting the priority tag based on storage attributes of the storage location at the private cloud.

Figure 7:
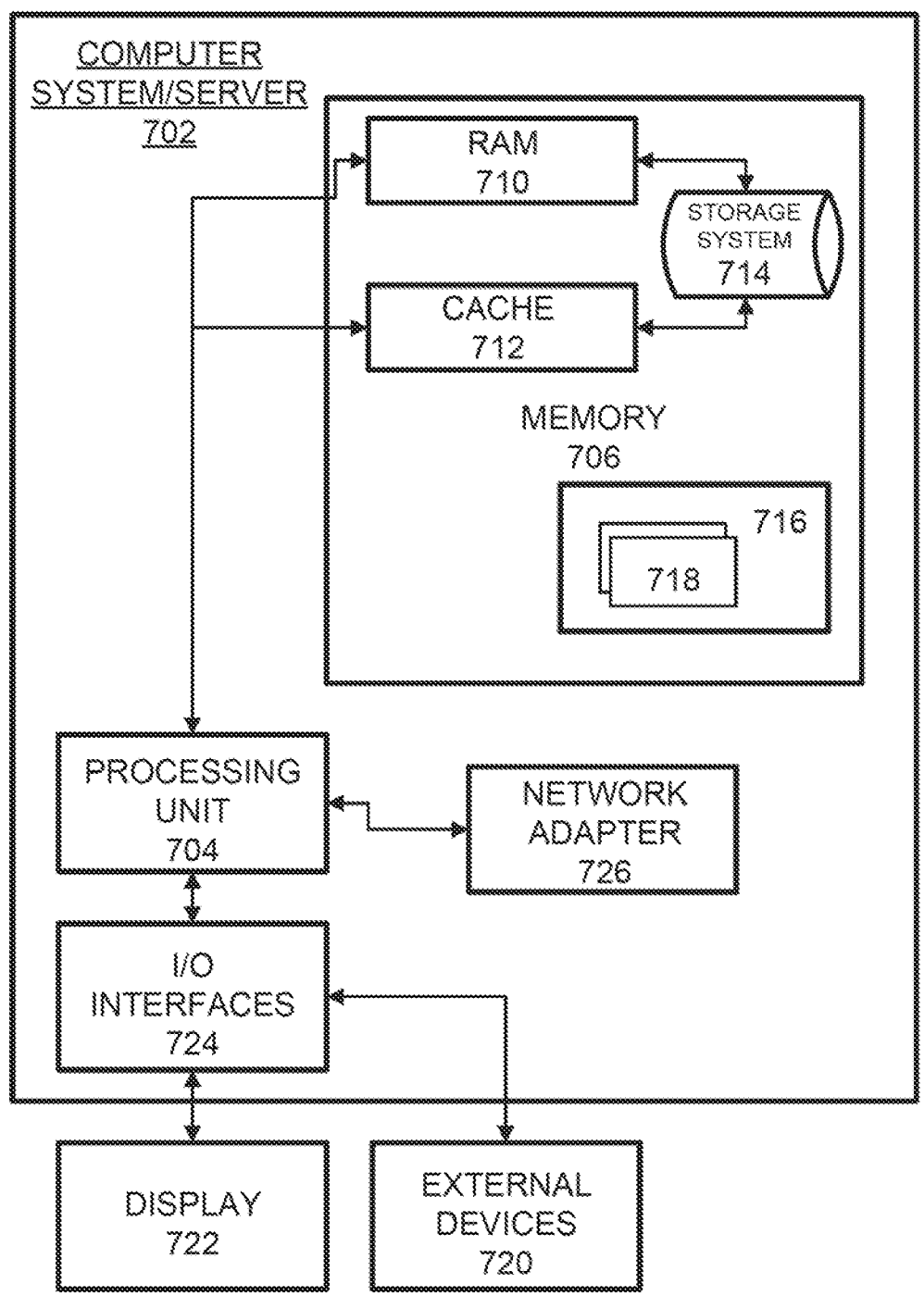
FIG. 7 is a diagram illustrating an example computing system that supports one or more of the example embodiments.

FIG. 7 illustrates an example system 700 that supports one or more of the example embodiments described and/or depicted herein. The system 700 comprises a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in the system 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, system memory 706 may include at least one program product having a set (e.g., at least one) of program modules that are configured to carry out the functions of various embodiments of the application.

Program/utility 716, having a set (at least one) of program modules 718, may be stored in system memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples include, but are not limited to, microcode, device drivers, redundant processing units, external disk drive arrays, RAID systems, tape drives, and data archival storage systems, etc.

Although an exemplary embodiment of at least one of a system, method, and non-transitory computer-readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
  a processor configured to
    identify storage attributes of a storage location of a private cloud,
    embed a priority tag into a replication request to replicate data to a public cloud based on the identified storage attributes of the storage location of the private cloud; and
  a network interface configured to transmit the tagged replication request from the private cloud to the public cloud based on a bandwidth assigned to the embedded priority tag.

2. The apparatus of claim 1, wherein the attributes of the storage location of the private cloud comprises latency added by the storage location, and the processor is further configured to select the priority tag from among a plurality of predefined priority tags based on the latency added by the storage location.

3. The apparatus of claim 1, wherein the network interface is configured to transmit the tagged replication request via a replication interface between the private cloud and the public cloud based on the bandwidth assigned to the embedded priority tag.

4. The apparatus of claim 1, wherein the processor is further configured to determine current network bandwidth parameters assigned to each of a plurality of predefined priority tags, and select the priority tag from the plurality of predefined priority tags based on the current network bandwidth parameters assigned to each of the plurality of predefined tags.

5. The apparatus of claim 1, wherein the private cloud comprises a host environment of a software application that sends the request and the public cloud comprises a backup site for data of the software application.

6. The apparatus of claim 1, wherein the processor is configured to query an application programming interface (API) of a cloud provider of the private cloud for the attributes of the storage location.

7. The apparatus of claim 1, wherein the processor is configured to embed a priority code point (PCP) tag into a header of a data packet based on a current bandwidth assigned to the PCP tag.

8. A method comprising:
  identifying storage attributes of a storage location of a private cloud;
  embedding a priority tag into a replication request to replicate data to a public cloud based on the identified storage attributes of the storage location of the private cloud; and
  transmitting the tagged replication request from the private cloud to the public cloud based on a bandwidth assigned to the embedded priority tag.

9. The method of claim 8, wherein the attributes of the storage location of the private cloud comprises latency added by the storage location, and the method further comprises selecting the priority tag from among a plurality of predefined priority tags based on the latency added by the storage location.

10. The method of claim 8, wherein the transmitting comprises transmitting the tagged replication request via a replication interface between the private cloud and the public cloud based on the bandwidth assigned to the embedded priority tag.

11. The method of claim 8, wherein the method further comprises determining current network bandwidth parameters assigned to each of a plurality of predefined priority tags, and selecting the priority tag from the plurality of predefined priority tags based on the current network bandwidth parameters assigned to each of the plurality of predefined tags.

12. The method of claim 8, wherein the private cloud comprises a host environment of a software application that sends the request and the public cloud comprises a backup site for data of the software application.

13. The method of claim 8, wherein the identifying comprises querying an application programming interface (API) of a cloud provider of the private cloud for the attributes of the storage location.

14. The method of claim 8, wherein the embedding comprises embedding a priority code point (PCP) tag into a header of a data packet based on a current bandwidth assigned to the PCP tag.

15. A non-transitory computer-readable medium comprising instructions which when executed by a processor cause a computer to perform a method comprising:
  identifying storage attributes of a storage location of a private cloud;
  embedding a priority tag into a replication request to replicate data to a public cloud based on the identified storage attributes of the storage location of the private cloud; and
  transmitting the tagged replication request from the private cloud to the public cloud based on a bandwidth assigned to the embedded priority tag.

16. An apparatus comprising:
  a processor configured to
    identify current bandwidth parameters assigned to a plurality of priority tags,
    select a priority tag based on priority attributes of a request to write data to a storage location of a private cloud and the current bandwidth parameters assigned to the plurality of tags, and
  a network interface configured to transmit a replication request from the private cloud to a public cloud based on current bandwidth parameters assigned to the selected priority tag.

17. The apparatus of claim 16, wherein the network interface is configured to transmit the replication request via a replication interface between the private cloud and the public cloud based on the current bandwidth parameters assigned to the selected priority tag.

18. The apparatus of claim 16, wherein the processor is configured to query an application programming interface (API) of a cloud provider of the private cloud for the current bandwidth parameters assigned to the plurality of priority tags.

19. The apparatus of claim 16, wherein the plurality of priority tags comprises a plurality of point code priority (PCP) tags which prioritize a plurality of classes of network traffic with respect to each other.

20. The apparatus of claim 16, wherein the processor is configured to select the priority tag based on storage attributes of the storage location at the private cloud.

21. A method comprising:
  identifying current bandwidth parameters assigned to a plurality of priority tags,
  selecting a priority tag based on priority attributes of a request to write data to a storage location of a private cloud and the current bandwidth parameters assigned to the plurality of tags, and
  transmitting a replication request from the private cloud to a public cloud based on current bandwidth parameters assigned to the selected priority tag.

22. The method of claim 21, wherein the transmitting comprises transmitting the replication request via a replication interface between the private cloud and the public cloud based on the current bandwidth parameters assigned to the selected priority tag.

23. The method of claim 21, wherein the identifying comprises querying an application programming interface (API) of a cloud provider of the private cloud for the current bandwidth parameters assigned to the plurality of priority tags.

24. The method of claim 21, wherein the plurality of priority tags comprises a plurality of point code priority (PCP) tags which prioritize a plurality of classes of network traffic with respect to each other.

25. The method of claim 21, wherein the selecting further comprises selecting the priority tag based on storage attributes of the storage location at the private cloud.

* * * * *